INVENTOR
FREDERICK W. SEYBOLD
BY Ostrolenk & Faber
ATTORNEYS

INVENTOR
FREDERICK W. SEYBOLD
BY Ostrolenk & Faber
ATTORNEYS

Nov. 13, 1956 F. W. SEYBOLD 2,770,301
BACK GAUGE-PLANETARY GEAR-BRAKE DISCONNECT FOR HYDRAULIC DRIVE
Filed June 20, 1951 6 Sheets-Sheet 4

INVENTOR
FREDERICK W. SEYBOLD
BY Ostrolenk & Faber
ATTORNEYS

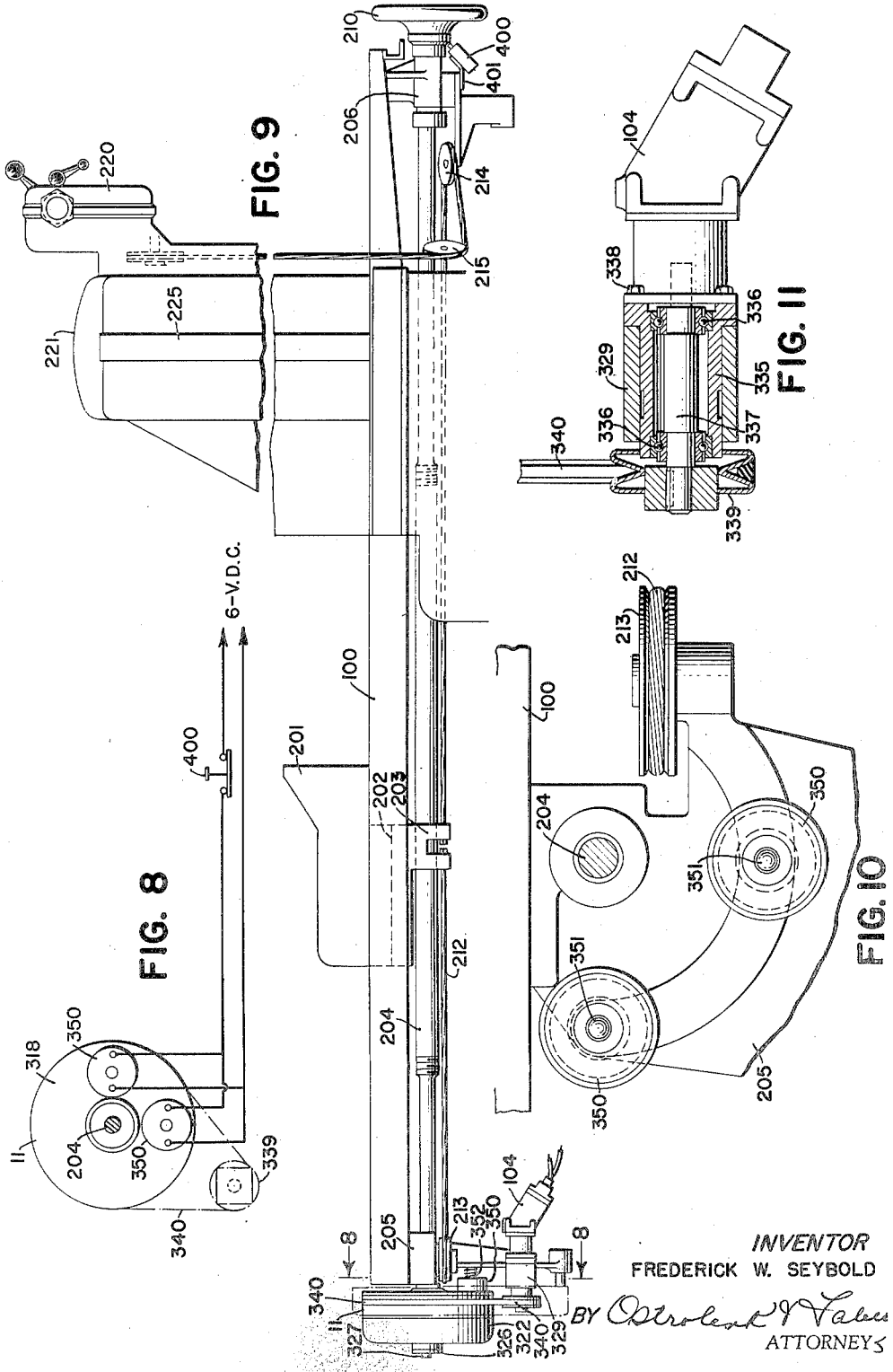

Nov. 13, 1956 F. W. SEYBOLD 2,770,301
BACK GAUGE-PLANETARY GEAR-BRAKE DISCONNECT FOR HYDRAULIC DRIVE
Filed June 20, 1951 6 Sheets-Sheet 6

*INVENTOR*
FREDERICK W. SEYBOLD
BY Ostrolenk & Faber
ATTORNEYS

United States Patent Office 2,770,301
Patented Nov. 13, 1956

2,770,301

BACK GAUGE-PLANETARY GEAR-BRAKE DISCONNECT FOR HYDRAULIC DRIVE

Frederick W. Seybold, Westfield, N. J., assignor to E. P. Lawson Co., Inc., New York, N. Y., a corporation of New York Application June 20, 1951, Serial No. 232,518

4 Claims. (Cl. 164—59)

My present invention relates to a hydraulically operated back gauge for paper cutters and more particularly to a back gauge operating mechanism adapted to move the back gauge through a series of steps to permit the cutter to perform a series of cuts on a paper stack.

For this purpose, in order to obtain speed in operation, the back gauge should move rapidly between cuts. But to ensure that the paper stack will stop at an accurate predetermined cutting position for each cut, the back gauge must be slowed up just before the cutting position so that when it is brought to a stop, the paper stack will not coast beyond the stop position.

Thus, I have provided novel hydraulic back gauge operating means which will move the back gauge rapidly between cuts, will slow the back gauge down just before a cutting position is reached and halt the back gauge at the cutting position.

Where automatic drive members are provided for the back gauge and where these drive members have a high ratio of speed reduction, excessive resistance to turning is encountered when the driven member becomes the driving member in adjusting the back gauge manually to locate the proper stops for the paper stack.

Accordingly, the primary object of my invention is the provision of novel means for releasing a unit of the automatic drive apparatus of the back gauge when it is desired to adjust the back gauge manually.

More specifically, I provide a novel transmission whereby the utilization of simplified braking mechanisms will permit the release of the reaction member of the transmission in order to turn the output member when the hydraulic drive input member is at rest.

This is particularly significant where the drive is a hydraulic one offering substantial resistance to manual operation.

The foregoing and many other objects of my invention will become apparent from the following description and drawings in which:

Figure 8 is a diagrammatic view showing the circuit arrangement for the brake magnets of my invention.

Figure 9 is a side view of the cutting machine showing the location of the drive unit.

Figure 10 is a view of the braking means taken on line 10—10 of Figure 12 looking in the direction of the arrows.

Figure 11 is a side view of the hydraulic motor and connecting elements partly in section taken on line 11—11 of Figure 13 looking in the direction of the arrows.

An understanding of the drive release for the back gauge and the function thereof requires first an understanding of one method of driving the back gauge.

Figure 1:
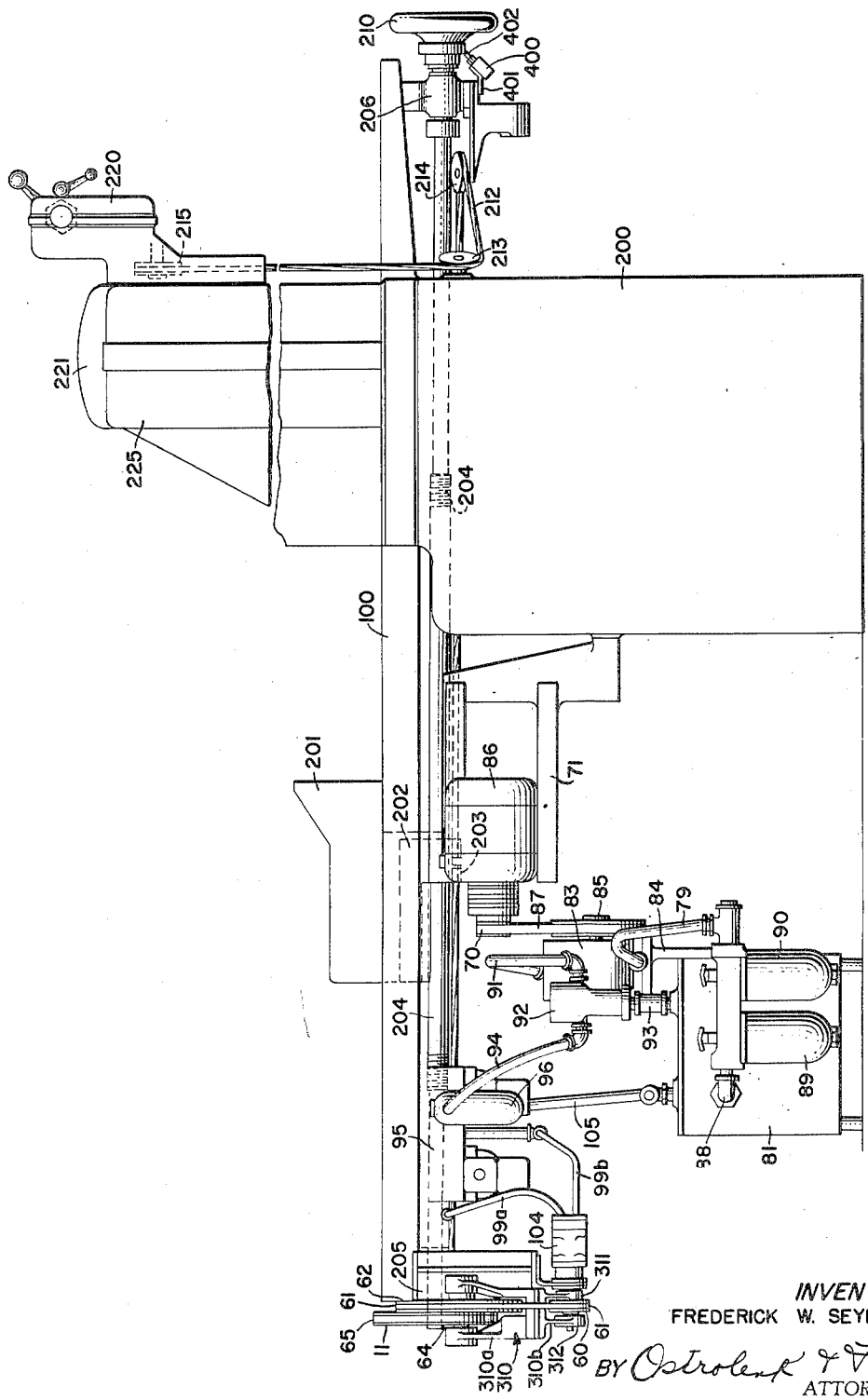
Figure 1 is a side view of my novel hydraulically operated back gauge mechanism.
Figure 2:
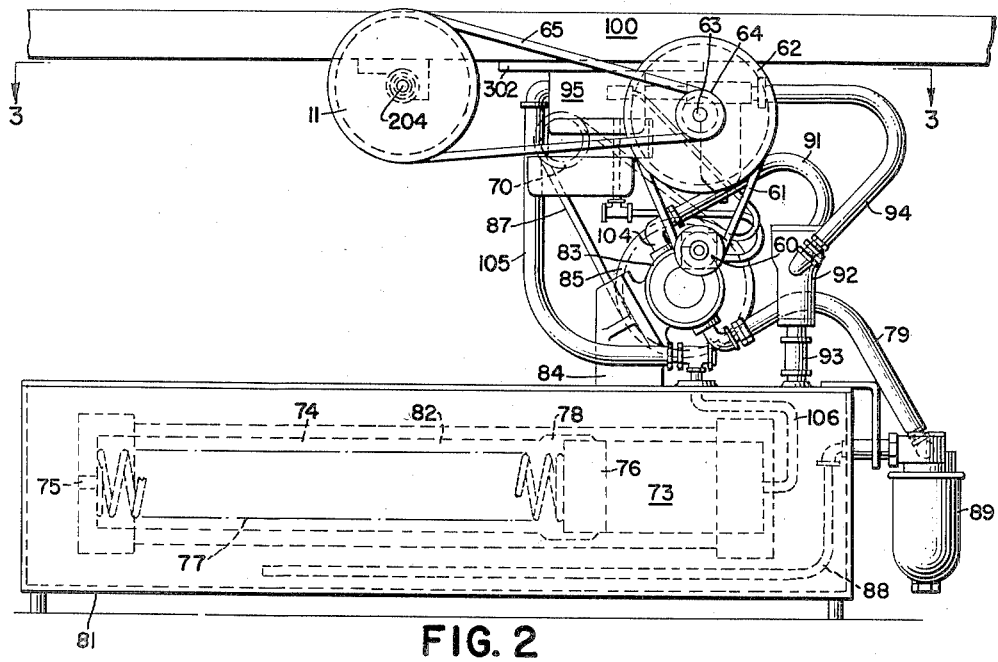
Figure 2 is a rear view of the mechanism in schematic form with some of the mechanism of Figures 1 and 8 to 13 omitted to simplify the description.
Figure 3:
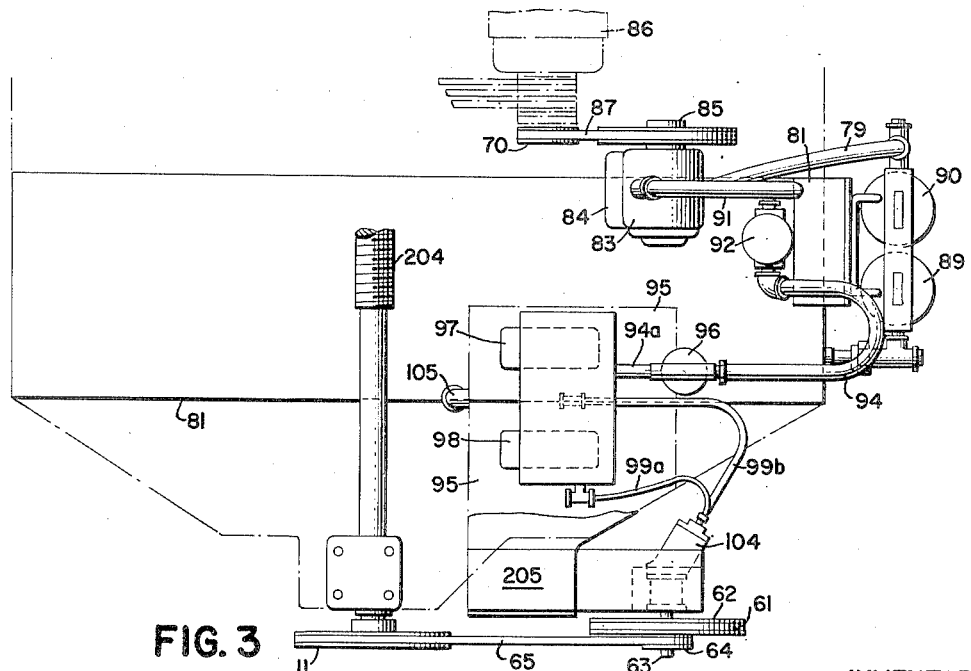
Figure 3 is a top view of the mechanism of Figure 1 taken from line 3—3 of Figure 2.

Referring first to Figures 1 to 3, the cutting machine in connection with which my novel back gauge is used is of the general type shown in application Serial No. 114,786, filed September 9, 1949, now Patent No. 2,574,501, granted November 13, 1951, and the back gauge operates for the general purposes therein described.

Thus, the machine is provided with the side frame base casting 200 which carries the bed plate or support 100 for a stack of paper. The back gauge 201 rides on the bed plate 100 and is provided with a bracket 202 extending downwardly through a longitudinal slot in bed plate 100 terminating in a nut 203 which engages the longitudinal screw 204 supported in appropriate bearings 205, 206 at the front and back of the bed plate 100.

The front of screw 204 is provided with the hand wheel 210 for manual rotation of screw 204 to obtain manual adjustment of the back gauge 201 when required. Cable 212 extending over guide pulleys 213, 214, 215 is connected to the back gauge 201 and extends up to the indicating and back gauge stop mechanism 220 mounted on the top cross bar 221 of the machine and operating in the manner described in application Serial No. 113,717, filed September 2, 1949, now Patent No. 2,628,680, granted February 17, 1953.

The side frame members 200 are extended up at 225 to furnish vertical slide ways for a knife bar and clamp which operate in the manner described in application Serial Serial No. 114,786, filed September 9, 1949. The operating mechanism for the knife bar and clamp are, as described in the aforesaid applications, mounted between the side frame members 225.

The feed screw 204 for the back gauge 201 may be rotated for automatic (non-manual) operation by the pulley 11 driven in turn by the hydraulic operating mechanism shown in the figures.

The reservoir tank 81 for the hydraulic fluid used in the system is located rearwardly of the base frame casting 200. An accumulator cylinder 82 is mounted in tank 81 and immersed in the reservoir oil; this obviates the necessity for extended connections between the reservoir 81 and the accumulator cylinder 82.

Bracket 84 supported on reservoir tank 81 carries a pump 83 driven by pulley 85 and V-belt 87 from pulley 70 of electric motor 86 mounted on bracket 71 carried by the base casting 200.

Pump 83 draws hydraulic fluid from reservoir tank 81 through the pipe 88, filters 89 and 90 and pipe 79 (see Figure 2) and discharges the hydraulic fluid through flexible hose 91 into the main relief valve 92.

Main relief valve 92 controls the pressure available to drive the back gauge 201 as hereinafter described. Relief valve 92 may, therefore, be adjusted to any selected pressure; its overflow is discharged through pipe 93 directly back to the reservoir tank 81.

Flexible hose 94 conducts hydraulic fluid under pressure from the main relief valve 92 to the micro-filter 96 and then through pipe 94a to the solenoid valve sub-base block 95.

Solenoid valve sub-base block 95 is provided with suitable passages hereinafter described in connection with Figures 4 to 7 to establish various hydraulic fluid circuits through the four-way solenoid valve 97 and the two-way solenoid valve 98.

Pipes 99a and 99b connect the solenoid valve sub-base block 95 with the fluid motor 104. The speed and direction of the fluid motor depends on the setting of solenoid valves 97 and 98.

Flexible hose 105 connects the valve sub-base block 95 to pipe 106 which enters the high pressure chamber 73 of accumulator 82. The low pressure chamber 74 of accumulator 82 communicates through opening 75 with the low pressure fluid in reservoir 81.

Piston 76 is urged by compression spring 77 in chamber 74 toward the right with respect to Figure 2 to create an initial elevated pressure in chamber 73 of accumulator 82. Piston 76 thus forms the boundary between chambers 73 and 74.

As pressure in chamber 73 increases, piston 76 is forced to the left against spring 77 further compressing the same. A relief path for excess pressure in chamber 73 is provided by the recess 78 in accumulator 82. When the piston, on being forced to the left with respect to Figure 2, reaches recess 78, the excess fluid under pressure may escape to the low pressure chamber 74 until the spring 77 can move piston 76 back to the right to close the recess 78.

The fluid motor 104 is connected by pulley 60 and belt 61 to pulley 62 on stub shaft 63. Pulley 64 on stub shaft 63 is connected by belt 65 to pulley 11 on screw 204 which drives the back gauge 201.

Thus, the back gauge is driven by the fluid motor 104 which in turn responds to the direction, pressure and rate of flow of the hydraulic fluid as hereinafter described in connection with Figures 4 to 7.

Motor 86 and pump 83 operate constantly so that the direction, pressure and rate of flow of the hydraulic fluid is determined by the valves 97 and 98. Valves 97 and 98 may be operated in any manner; but it is preferred that they be solenoid operated.

In schematic Figures 4 to 7:

I—A diagonally hatched pipe or area indicates that the fluid therein is at atmospheric or reservoir pressure.

II—A horizontally hatched pipe or area indicates that the fluid therein is at the discharge pressure of pump 83.

III—A dotted pipe or area indicates that the fluid therein is at accumulator pressure.

IV—A blank pipe indicates that there is no fluid therein.

Figure 4:
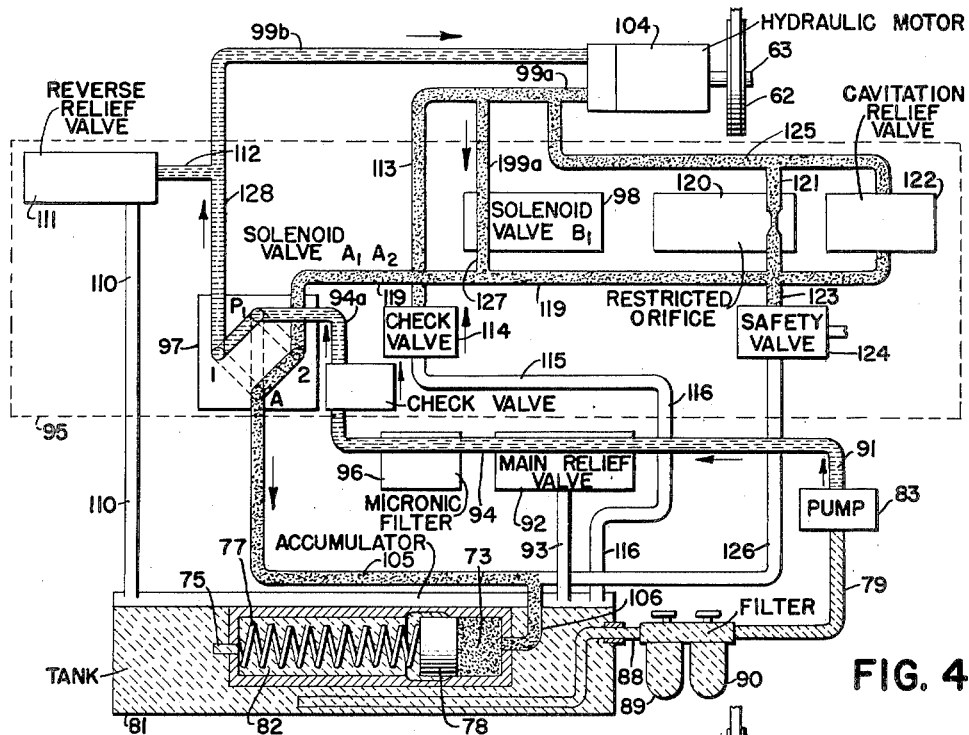
Figures 4 to 7 are schematic views of the hydraulic operating mechanism illustrating the operation of the mechanism for fast forward motion (Figure 4), slow forward motion (Figure 5), stopping of the back gauge (Figure 6), and reverse movement of the back gauge (Figure 7).

For fast operation of the fluid motor 104 in the forward direction to move the back gauge 201 rapidly in the forward direction, the valves 97 and 98 are set in the positions of Figure 4.

In valve 97, port A connected to pipe 205 is connected to port 2 which is connected by passages 119, 127 to valve 98. Port 1 of valve 97 is connected to passage 128 and also to port $P_1$ which is connected to pipe 94A.

Valve 98 is opened to connect passages 119—127 through valve 98 to passages 199a—99a.

The fluid circuit for fluid motor 104 is then from the discharge port of the pump 83 through passage 91 to the main relief valve 92, through passage 94 into the microfilter 96 and hence through port 1, through passages 128 and 99b, to the fluid motor 104.

The exhaust of fluid motor 104 is then through passages 99a and 199a to solenoid valve 98 ($B_1$) then through passages 127, 119 to port 2 of solenoid valve 97, and out through port A, passage 105 and 106 into the pressure chamber 73 of the accumulator 82.

The speed of fluid motor 104 is thus determined by the difference between the pressure in accumulator chamber 73 as maintained by compression spring 77 and the pressure exerted by pump 83.

This difference in pressure is maintained at a constant rate since the reverse relief valve 111 connected by passage 112 to passage 128 and pipe 99b on one side and by passage 110 on the other side to reservoir 81 is biased to maintain passage 112 closed at pump pressure but to connect passages 112 and 110 at pressures substantially above that of pump 83 to prevent too great a back pressure. The relief pressure at valve 111 must be higher, however, than the relief pressure at micro-relief valve 92 to permit the slow operation of the back gauge 201 hereinbelow described.

In the operation of a back gauge 201, it is necessary to move the back gauge rapidly between cuts, but to slow down the movement of the back gauge as the end of the movement approaches to prevent coasting of the paper stack beyond the cutting point when the back gauge stops.

This slow down of the movement of the back gauge is brought about by closing of the solenoid valve 98 ($B_1$), whereby the only remaining path for the exhaust oil from the fluid motor 104 is through passage 125 and 121 to the restricted orifice 120.

This sudden restriction to oil flow would also build up a high pressure in passage 125 unless said pressure may be relieved through cavitation relief valve 122.

This slows down motor 104 and hence back gauge 201. The excess fluid delivered by the pump 83 which cannot pass through the restricted orifice 120 of valve 92 then discharges through the main relief valve 92 and through pipe 93 into the reservoir 81.

Figure 5:
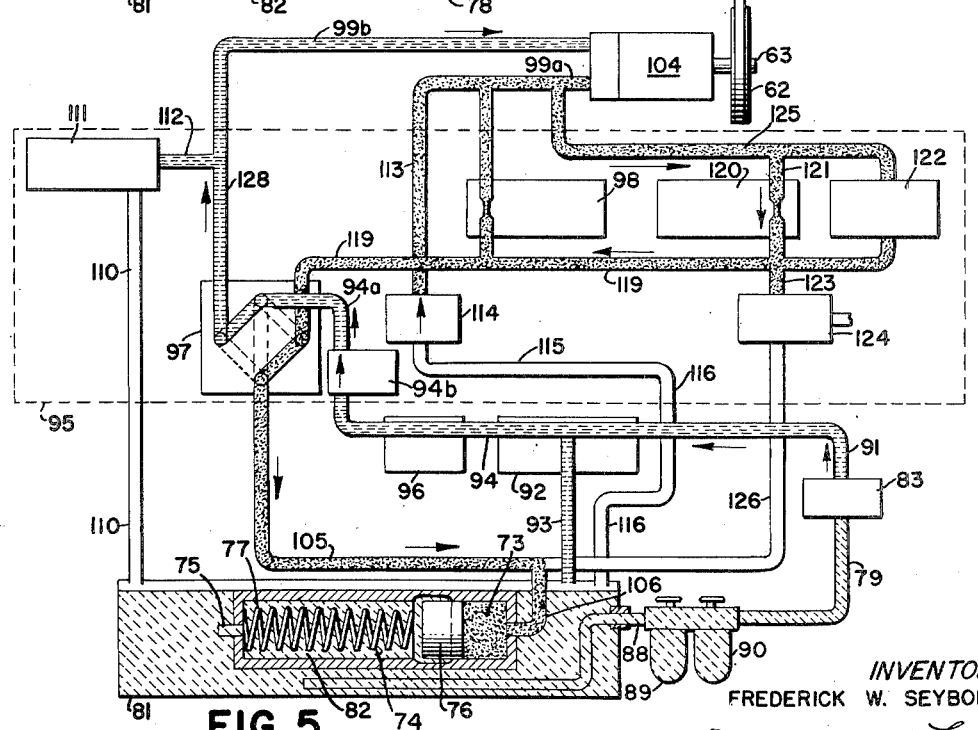
Figure 6:
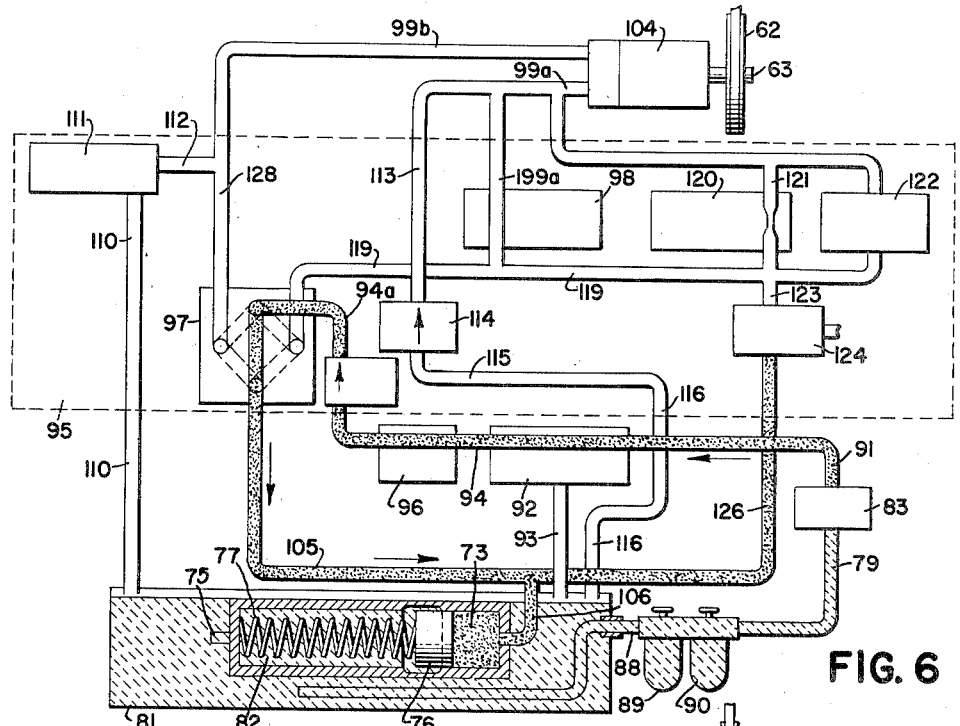

This is the condition shown in Figure 5 wherein all elements are set for forward operation of the back gauge at slow speed.

When the back gauge 201 reaches the stop position (see Figure 6), valve 97 is moved to connect ports $P_1$ and A and to close the other ports and connections.

The fluid motor 104 is thus cut-off and ceases to operate. Pump 83 is then connected by pipes and elements 91, 92, 94, 96, 94a, $P_1$ of 97, A of 97, 105, 106 to the accumulator chamber 73 where it may charge up accumulator chamber 73.

After the back gauge 201 has completed its forward movement, it must be returned to its initial retracted position so that it may start over again with a new stack of paper.

Figure 7:
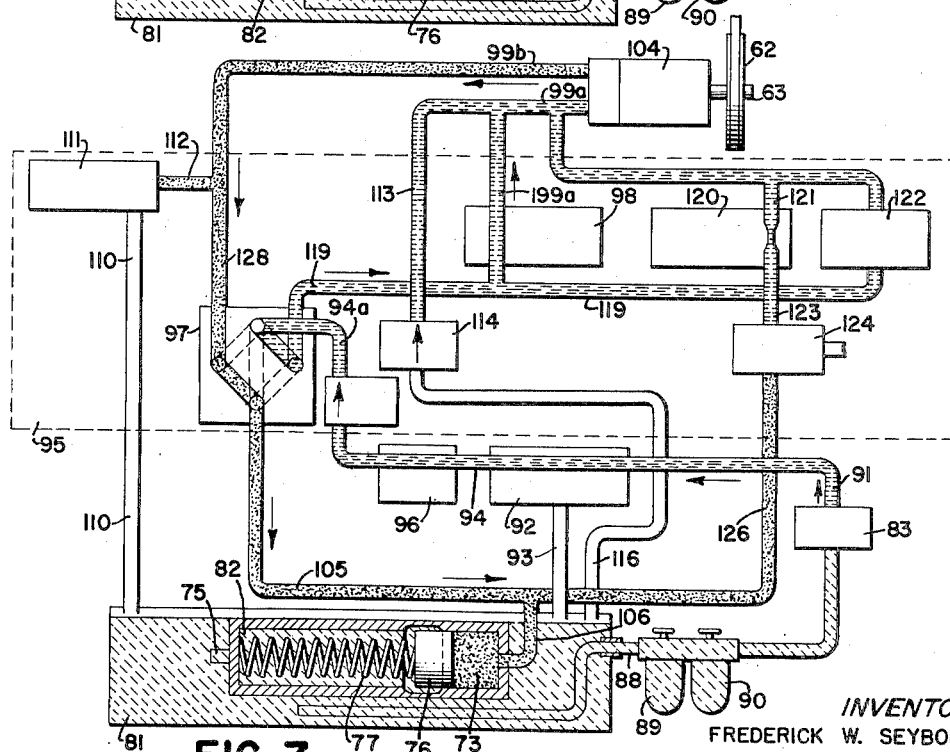

This is accomplished (as seen in Figure 7) by opening valve 98 and by connecting together ports $P_1$ and 2 of valve 97 and connecting ports 1 and A of valve 97.

The pump 83 will now deliver pressure oil through 91—92—94—96—94a—$P_1$ and 2 of valve 97—119—127—valve 98—199a—99a into fluid motor 104.

The function of the "reverse relief valve" is as follows:

When the motor is turning in reverse and the discharge passage is suddenly blocked by the closing of port 1, the momentum of the motor would build up excessive pressure in the passages 99b and 128 and to relieve this condition the "reverse relief valve" is provided so that oil may be discharged through passage 112 through valve 111 and passage 110 into the reservoir tank 81.

Reverse relief valve 111 permits excess pressure to bleed off from pipe 128 during the reverse operation. The inertia of the motor may tend to keep it running in reverse when the oil is cut off and may pull a vacuum which may draw air through the bearings. Hence, check valve 114 and line 113—115—116 are provided so that oil will be drawn instead of the vacuum.

By this means, therefore, a simplified easily controlled hydraulically operated mechanism is provided to permit the fast forward movement, slow forward movement, stopping and reverse movement of back gauge 201.

The restricted orifice member 120 connected by passage 121 across passages 125—99a and 119 combined with the cavitation relief valve 122 in parallel therewith between these passages serve in a manner well-known in the art of hydraulic mechanism to maintain unimpeded operation of the device.

The function of safety valve 124 is as follows:

When the ports 1 and 2 of the valve 97 are closed to stop the fluid motor 104, its momentum will build up pressure in passage 125; said pressure may be relieved through safety valve 124. While cavitation relief valve 122 can open, oil flow therethrough would still be blocked at valve 97, the setting of safety valve 124 being considerably higher than that of valve 122.

By the means herein described, the various movements of the back gauge may be automatically controlled by elements which respond to movement of the back gauge to predetermined positions to slow and then stop the back gauge. Valves 97 and 98 are operated for forward or reverse movement as the case may be.

The valves 97 and 98 may be solenoid operated by means energized in accordance with the disclosure of application Serial No. 113,717, filed September 2, 1949 or in any other suitable manner.

In order that hydraulic motor 104 may develop sufficient torque and rotate with a minimum of pulsation, the speed of motor 104 must not be reduced below 90 to 100 R. P. M. for the slow speed operation of the back gauge, and this slow speed, therefore requires a pulley ratio of about 9 to 1 between motor 104 and pulley 11.

In the operation of the back gauge 201, it becomes frequently necessary that the gauge be moved by turning the hand wheel 210 at the front of the machine.

Because of this large belt reduction, the turning effort required at the hand wheel 210 would be considerable in order to turn the hydraulic motor 104 as well as to move the back gauge 210 and the paper pile.

The purpose of the present invention is to provide means to enable the operator to turn the hand wheel 210 when the hydraulic motor 104 has stopped.

Figure 12:
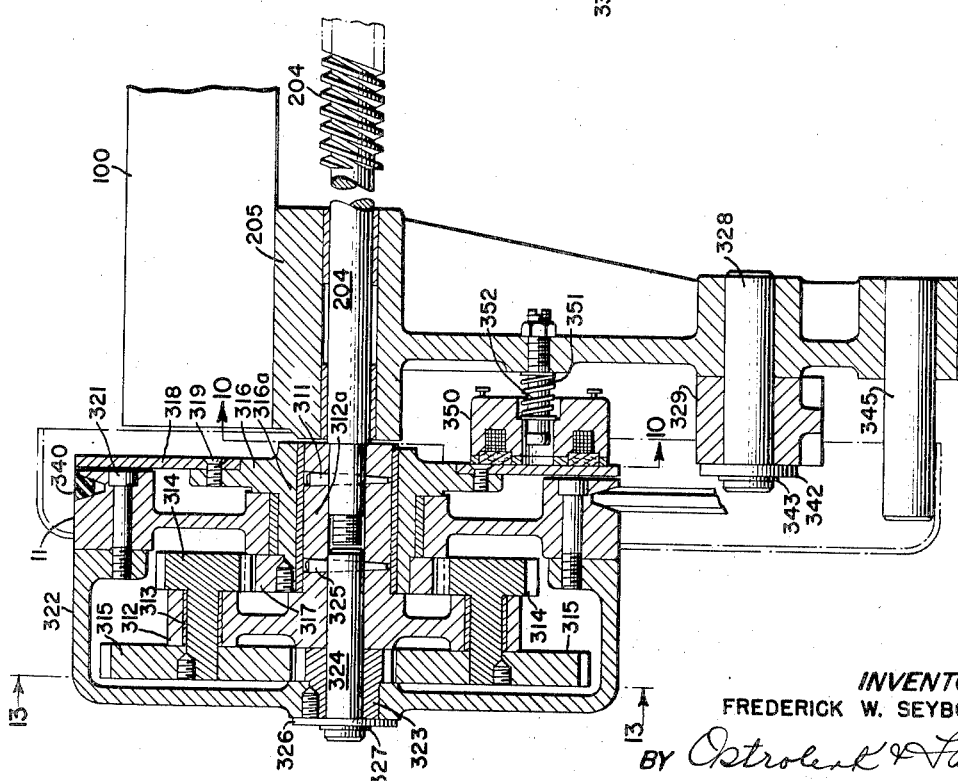
Figure 12 is a cross-sectional elevation of the transmission taken on line 12—12 of Figure 13 looking in the direction of the arrows.

Secured to screw 204 by means of taper pin 311 (see Figure 12) is the planetary gear arm 312 which is provided with bronze bearings 313 in which is journalled the shaft of planetary pinion 314. Secured to the shaft of pinion 314 is the planetary gear 315 so that pinion 314 and gear 315 are integral.

Journalled over the long hub 312a of the planetary gear arm 312 is the hub 316a of reaction gear carrier 316 to one end of which is secured the reaction sun gear 317. On the other end of carrier 316 is mounted the armature plate 318 secured thereto by screws 319. On the reaction gear hub 316a the driving pulley 11 is journalled and secured to the sun gear casing 322 by the screws 321. The sun gear 323 is secured to said casing and is journalled on the short shaft 324 which is secured to the planetary gear arm 312 by the taper pin 325. A washer 326 and snap ring 327 retain the assembly in correct relationship.

Figure 13:
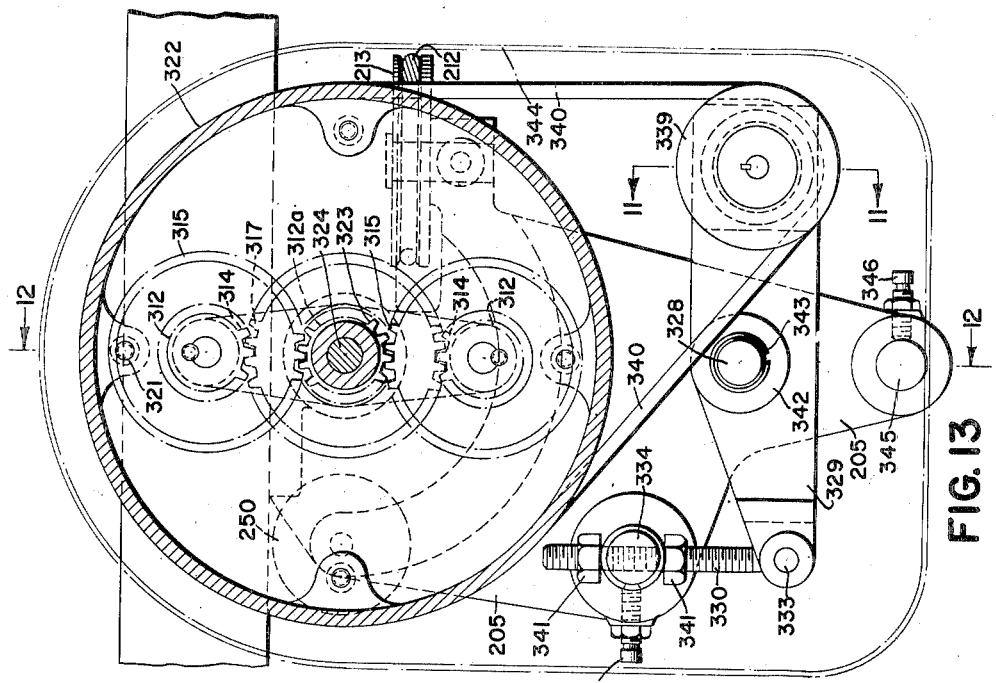
Figure 13 is an end view of the transmission partly in cross-section taken on line 13—13 of Figure 12 looking in the direction of the arrows.

The bracket 205 is provided with a fulcrum pin 328 on which is pivoted the forked lever 329 (see also Figure 13). An eye bolt 330 is pivoted on pin 333 in the fork lever 329. The threaded end of said eye bolt 330 passes through a hole in the pin 334 which is held by a set screw 334a in bracket 205.

On the other end of lever 329 (see Figure 11), a long sleeve 335 is secured which houses the ball bearings 336 and in which the driving shaft 337 is journalled. The right-hand end of the shaft 337 has multiple splines which fit into the driver of the hydraulic motor 104 which is secured to the long sleeve 335 by means of the screws 338.

On the other end of the shaft 337 is keyed the pulley 339. A V-belt 340 connects pulley 339 with the driving pulley 11. The proper belt tension is obtained by the adjustment of the nuts 341 on the threaded end of eye bolt 330.

The lever 329 is also held in position by the washer 342 and snap ring 343. A belt guard 344 with an anchor pin 345 is held by set screw 346 in the bracket 205.

A plurality of electro-magnets 350 (two in the embodiment shown) are mounted on pins 351 which are threaded into bracket 205 and are held in frictional contact with the armature plate 318 by the spring 352. These electromagnets 350 are energized by 6 volt direct current and when so energized will prevent the armature plate 318 and consequently the sun gear 317 from rotating.

After the back gauge has come to a stop, it may be necessary for the operator to make a small adjustment in the location of the back gauge by turning a hand wheel 210 on the screw 204.

When the hydraulic motor 104 has come to a stop, it is very difficult to turn the shaft 337 through the planetary gearing and belt 340 unless the sun gear 317 is free to turn; and when the magnets 350 are de-energized said sun gear is free to turn.

Therefore, when the hydraulic motor 104 is running, the magnets are energized and prevent the sun gear 317 from rotating because the armature plate 318 which is integral with the sun gear 317 on hub 316 is held by the magnets 350; thus, through the planetary gearing and pulley 11 a speed reduction for the screw 204 is attained. When the motor 104 stops, the magnets 350 become de-energized; the sun gear 323 will now be held by the hydraulic motor 104 (through belt 340), but sun gear 317 is now free and the screw 204 can be rotated by hand by the hand wheel 210 at the front of the machine.

The energizing and de-energizing of the magnets is caused by the completion of interruption of the circuit which operates the solenoids of the valves 97 and 98.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a paper cutter, having a horizontal table; a back gauge therefor; a longitudinal screw driving the back gauge; a hand wheel at one end of said screw; drive means for said screw; the invention comprising a connection between said drive means and said screw including a planetary gear and sun gear transmission; the drive means being connected to the planetary gear; the sun gear being rotatably mounted on said screw; an additional planetary gear arrangement between the first-mentioned planetary gear and the screw; apparatus for holding the first-mentioned sun gear stationary and causing the drive means to be connected through said first-mentioned planetary gear and said additional planetary gear arrangement to said screw, said drive means comprising a hydraulic motor, and means for releasing said sun gear to permit free rotation of said screw when said hydraulic motor is inoperative, whereby said screw may be readily rotated by said hand wheel.

2. In a paper cutter, having a horizontal table; a back gauge therefor; a longitudinal screw driving the back gauge; a hand wheel at one end of said screw; drive means for said screw; the invention comprising a connection between said drive means and said screw including a planetary gear and sun gear transmission; the drive means being connected to the planetary gear; the sun gear being rotatably mounted on said screw; an additional planetary gear arrangement between the first-mentioned planetary gear and the screw; apparatus for holding the first-mentioned sun gear stationary and causing the drive means to be connected through said first-mentioned planetary gear and said additional planetary gear arrangement to said screw; said apparatus being operable to release said first-mentioned sun gear to permit said screw to rotate free of said drive means, said drive means comprising a hydraulic motor, and means for releasing said sun gear to permit free rotation of said screw when said hydraulic motor is inoperative, whereby said screw may be readily rotated by said hand wheel.

3. In a paper cutter, having a horizontal table; a back gauge therefor; a longitudinal screw driving the back gauge; a hand wheel at one end of said screw; drive means for said screw; the invention comprising a connection between said drive means and said screw including a planetary gear and sun gear transmission; the drive means being connected to the planetary gear; the sun gear being rotatably mounted on said screw; an additional planetary gear arrangement between the first-mentioned planetary gear and the screw; said first-mentioned sun gear carrying a magnetizable plate; electro-magnetic means energizable to hold said plate and sun gear stationary and causing the drive means to be connected through said first-mentioned planetary gear and said additional planetary gear arrangement to said screw, said drive means comprising a hydraulic motor and means for de-energizing said electromagnetic means for effecting free rotation of said screw whereby said screw may be readily rotated by said hand wheels when said hydraulic motor is inoperative.

4. In a paper cutter, having a horizontal table; a back gauge therefor; a longitudinal screw driving the back gauge; a hand wheel at one end of said screw; drive means for said screw; the invention comprising a connection between said drive means and said screw including a planetary gear and sun gear transmission; the drive means being connected to the planetary gear; the sun gear being rotatably mounted on said screw; an additional planetary gear arrangement between the first-mentioned planetary gear and the screw; said first-mentioned sun gear carrying a magnetizable plate; electro-magnetic means energizable to hold said plate and sun gear stationary and causing the drive means to be connected through said first-mentioned planetary gear and said additional planetary gear arrangement to said screw; said electro-magnetic means being de-energizable to release said first-mentioned sun gear to permit said screw to rotate free of said drive means, said drive means comprising a hydraulic motor and means for de-energizing said electromagnetic means for effecting free rotation of said screw whereby said screw may be readily rotated by said hand wheels when said hydraulic motor is inoperative.

References Cited in the file of this patent
UNITED STATES PATENTS

| | | |
|---|---|---|
| 1,264,715 | Wadhams | Apr. 30, 1918 |
| 2,085,981 | Iversen | July 6, 1937 |
| 2,159,980 | Banker | May 30, 1939 |
| 2,176,512 | Schwarcz | Oct. 17, 1939 |
| 2,213,068 | Eickman | Aug. 27, 1940 |
| 2,263,453 | Browne | Nov. 18, 1941 |

FOREIGN PATENTS

| | | |
|---|---|---|
| 475,256 | Great Britain | Nov. 16, 1937 |